US009092704B2

(12) United States Patent
Yoshida

(10) Patent No.: US 9,092,704 B2
(45) Date of Patent: Jul. 28, 2015

(54) IMAGE FORMING SYSTEM, IMAGE FORMING APPARATUS, AND RECORDING MEDIUM

(71) Applicant: Okihisa Yoshida, Kawanishi (JP)

(72) Inventor: Okihisa Yoshida, Kawanishi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 93 days.

(21) Appl. No.: 13/756,019

(22) Filed: Jan. 31, 2013

(65) Prior Publication Data

US 2013/0208296 A1     Aug. 15, 2013

(30) Foreign Application Priority Data

Feb. 15, 2012    (JP) ................................. 2012-030190

(51) Int. Cl.
    *G06F 3/12*          (2006.01)
    *G06K 15/00*       (2006.01)
    (Continued)

(52) U.S. Cl.
    CPC .............. *G06K 15/02* (2013.01); *H04N 1/0048* (2013.01); *H04N 1/00244* (2013.01); *H04N 1/00464* (2013.01); *H04N 1/00482* (2013.01); *H04N 1/32106* (2013.01); *H04N 1/00472* (2013.01); *H04N 2201/0094* (2013.01); *H04N 2201/328* (2013.01); *H04N 2201/3212* (2013.01); *H04N 2201/3273* (2013.01); *H04N 2201/3276* (2013.01)

(58) Field of Classification Search
None
See application file for complete search history.

(56) References Cited

U.S. PATENT DOCUMENTS 1,967,464 A1     5/2007    Ohta et al.
2005/0125379 A1*   6/2005    Choi et al. .................... 707/1
(Continued)

FOREIGN PATENT DOCUMENTS

CN          1967464 A      5/2007
CN        101237499 A     8/2008
(Continued)

OTHER PUBLICATIONS

Office Action (Notice of Reasons for Refusal) issued on Mar. 11, 2014, by the Japan Patent Office in corresponding Japanese Patent Application No. 2012-030190, and an English Translation of the Office Action. (6 pages).

(Continued)

*Primary Examiner* — Marivelisse Santiago Cordero
*Assistant Examiner* — Moustapha Diaby
(74) *Attorney, Agent, or Firm* — Buchanan Ingersoll & Rooney PC

(57) ABSTRACT

An image forming apparatus includes a storage unit that stores prohibited combination information, a display control unit that displays a user interface screen on a display unit, based on web page data that is received from a web server in the server apparatus, using a web browser that communicates with the web server, a first determination unit that determines, based on the prohibited combination information, whether or not the two or more settings that are prohibited from being combined are included in a plurality of current settings that include a content of change of settings received using the user interface screen, and a storage information control unit that stores a fact that the two or more settings prohibited from being combined are included in the current settings, in predetermined data. The display control unit, via the predetermined data, acquires the fact, and updates the user interface screen.

10 Claims, 14 Drawing Sheets

(51) Int. Cl.
*G06K 15/02* (2006.01)
*H04N 1/00* (2006.01)
*H04N 1/32* (2006.01)

(56) References Cited

U.S. PATENT DOCUMENTS

| | | | |
|---|---|---|---|
| 2005/0138571 A1* | 6/2005 | Keskar et al. | 715/789 |
| 2007/0109593 A1* | 5/2007 | Ohta et al. | 358/1.15 |
| 2008/0094659 A1* | 4/2008 | Ito | 358/1.15 |
| 2008/0150952 A1 | 6/2008 | Koarai | |
| 2009/0083860 A1* | 3/2009 | Nathan et al. | 726/28 |
| 2009/0180140 A1* | 7/2009 | Kawamura | 358/1.15 |
| 2009/0271414 A1* | 10/2009 | Benson | 707/10 |
| 2009/0310170 A1 | 12/2009 | Murakami et al. | |
| 2011/0032569 A1* | 2/2011 | Ohashi | 358/1.15 |
| 2011/0035704 A1* | 2/2011 | Nishino et al. | 715/810 |
| 2011/0107432 A1* | 5/2011 | Oomori | 726/27 |
| 2011/0128578 A1* | 6/2011 | Umenaga | 358/1.15 |
| 2011/0239124 A1* | 9/2011 | Tsujimoto | 715/741 |
| 2011/0261388 A1* | 10/2011 | Tsujimoto | 358/1.14 |
| 2011/0310409 A1 | 12/2011 | Yukumoto et al. | |
| 2012/0030337 A1* | 2/2012 | Bang | 709/223 |
| 2012/0030526 A1* | 2/2012 | Matsuda | 714/57 |
| 2012/0265989 A1* | 10/2012 | Lee et al. | 713/168 |

FOREIGN PATENT DOCUMENTS

| | | |
|---|---|---|
| JP | 2009-302769 A | 12/2009 |
| JP | 2012-008662 A | 1/2012 |

OTHER PUBLICATIONS

First Office Action issued Dec. 18, 2014 in corresponding Chinese Application No. 201310049049.1, with English translation.

* cited by examiner

Fig.13

<PROHIBITED COMBINATION INFORMATION MP>

27

| No. | SETTING SA<br>(SETTING ITEM = SETTING) | SETTING SB<br>(SETTING ITEM = SETTING) |
|---|---|---|
| 1 | "FILE FORMAT" = "JPEG" | "COLOR SETTING" =<br>"MONOCHROME BINARY" |
| 2 | "FILE FORMAT" =<br>"SEARCHABLE PDF" | "RESOLUTION" =<br>"HIGH RESOLUTION (600 dpi)" |

⋮

IMAGE FORMING SYSTEM, IMAGE FORMING APPARATUS, AND RECORDING MEDIUM

This application is based on Japanese Patent Application No. 2012-030190 filed on Feb. 15, 2012, the contents of which are hereby incorporated by reference.

BACKGROUND OF THE INVENTION

1. Technical Field

The present invention relates to an image forming system and a technique related thereto.

2. Related Art

There is an image forming system in which an image forming apparatus such as a Multi-Functional Peripheral (MFP) and a server computer execute predetermined processing in cooperation with each other.

One example is an image forming system in which an MFP and a server computer (specifically, application software executed in the server computer) execute processing such as distributing a scanned image obtained by the MFP to a plurality of client computers via a network, in cooperation with each other.

In the image forming system, for example, a scanning operation is executed after various setting operations have been performed using an operation panel unit of the MFP, and a scanned image generated by the scanning operation is distributed via the server computer to each client computer.

Immediately prior to the scanning operation, various setting operations are performed using the operation panel unit of the MFP. Specifically, various types of mode settings (e.g., image quality setting, color setting, and image file format setting) for the scanned image generation operation (image forming operation) performed by the MFP are made using the operation panel unit of the MFP. The operation panel unit is provided with a touch screen or the like, and a user interface is constructed using the touch screen.

Meanwhile, a technique has been proposed in which a user interface in the operation panel unit of the MFP is constructed using web technology (see, for example, Japanese Patent Application Laid-open No. 2009-302769). Specifically, a web browser in the MFP communicates with a web server in the server computer using a predetermined protocol (e.g., Hypertext Transfer Protocol (HTTP)) and receives data (web page data) for user interface screen display from the web server. As a result, a user interface screen is displayed by the web browser.

In the image forming system as described above, it is preferable that an interface is constructed using the web browser that communicates with the web server. This makes it possible to easily improve the degree of freedom of screen design or the like on the application side.

Incidentally, a plurality of mode settings for the image forming operation (e.g., image quality setting, color setting, and image file format setting for the scanned image generation operation) include two or more settings that are prohibited from being set in combination with each other. That is, two or more settings that are prohibited from being combined are present in a plurality of settings.

For example, a given MFP may assume that the color setting for JPEG data is either "full color" or "grayscale" and may not permit "monochrome binary" as the color setting for JPEG data. In other words, there are cases where a combination of "JPEG" as the image file format and "monochrome binary" as the color setting is prohibited.

In many cases, such a prohibited combination of settings differs from model to model. In order to create the server application software of the above-described image forming system to be compatible with a plurality of MFPs, it is necessary to take prohibited combination information regarding each of the MFPs into consideration. As a result, a significant number of man-hours is required to create the server application software.

SUMMARY OF THE INVENTION

It is an object of the present invention to provide a technique that enables an image forming system to be relatively easily constructed while taking into consideration combination prohibiting processing regarding settings for the image forming apparatus.

According to a first aspect of the present invention, an image forming system includes an image forming apparatus, and a server apparatus communicable with the image forming apparatus. The image forming apparatus includes a storage unit configured to store prohibited combination information about two or more settings regarding the image forming apparatus, the two or more settings being prohibited from being set in combination with each other, a display control unit configured to display a user interface screen on a display unit, based on web page data that is received from a web server in the server apparatus, using a web browser that communicates with the web server, a reception unit configured to receive an input for changing settings, using the user interface screen, a first determination unit configured to determine, based on the prohibited combination information, whether or not the two or more settings that are prohibited from being combined are included in a plurality of current settings that include a content of change of settings received by the reception unit, and a storage information control unit configured to, in response to the first determination unit determining that the two or more settings that are prohibited from being combined are included in the plurality of current settings, store a fact that the two or more settings that are prohibited from being combined are included in the plurality of current settings, in predetermined data in a predetermined storage area under control of the web browser. The display control unit is configured to, via the predetermined data, acquire the fact that the two or more settings that are prohibited from being combined are included in the plurality of current settings, and update the user interface screen.

According to a second aspect of the present invention, an image forming apparatus communicable with a server apparatus, includes a storage unit configured to store prohibited combination information about two or more settings regarding the image forming apparatus, the two or more settings being prohibited from being set in combination with each other, a display control unit configured to display a user interface screen on a display unit, based on web page data that is received from a web server in the server apparatus, using a web browser that communicates with the web server, a reception unit configured to receive an input for changing settings, using the user interface screen, a determination unit configured to determine, based on the prohibited combination information, whether or not the two or more settings that are prohibited from being combined are included in a plurality of current settings that includes a content of change of settings received by the reception unit, and a storage information control unit configured to, in response to the determination unit determining that the two or more settings that are prohibited from being combined are included in the plurality of current settings, store a fact that the two or more settings that are prohibited from being combined are included in the plurality of current settings, in predetermined data in a predetermined storage area under control of the web browser. The display control unit is configured to, via the predetermined data, acquire the fact that the two or more settings that are prohibited from being combined are included the plurality of current settings, and update the user interface screen.

According to a third aspect of the present invention, a non-transitory computer-readable recording medium that records a program for causing a computer built into an image forming apparatus to execute the steps of a) displaying a user interface screen regarding the image forming apparatus, based on web page data that is received from a web server in an external server apparatus, using a web browser that communicates with the web server, b) receiving an input for changing settings regarding the image forming apparatus, using the user interface screen, c) based on prohibited combination information regarding two or more settings that are prohibited from being set in combination with each other, the prohibited combination information being stored in the image forming apparatus, determining whether or not the two or more settings that are prohibited from being combined are included in a plurality of current settings obtained after the input for changing settings, d) in response to determining that the two or more settings that are prohibited from being combined are included in the plurality of current settings, storing a fact that the two or more settings that are prohibited from being combined are included in the plurality of current settings, in predetermined data in a predetermined storage area under control of the web browser, and e) via the predetermined data, acquiring the fact that the two or more settings that are prohibited from being combined are included in the plurality of current settings, and updating the user interface screen.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a conceptual diagram illustrating an initial HTTP request and the like.

FIG. 13 illustrates prohibited combination information.

DETAILED DESCRIPTION OF THE PREFERRED EMBODIMENTS

Hereinafter, embodiments of the present invention will be described with reference to the drawings.

1. Configuration

Figure 1:
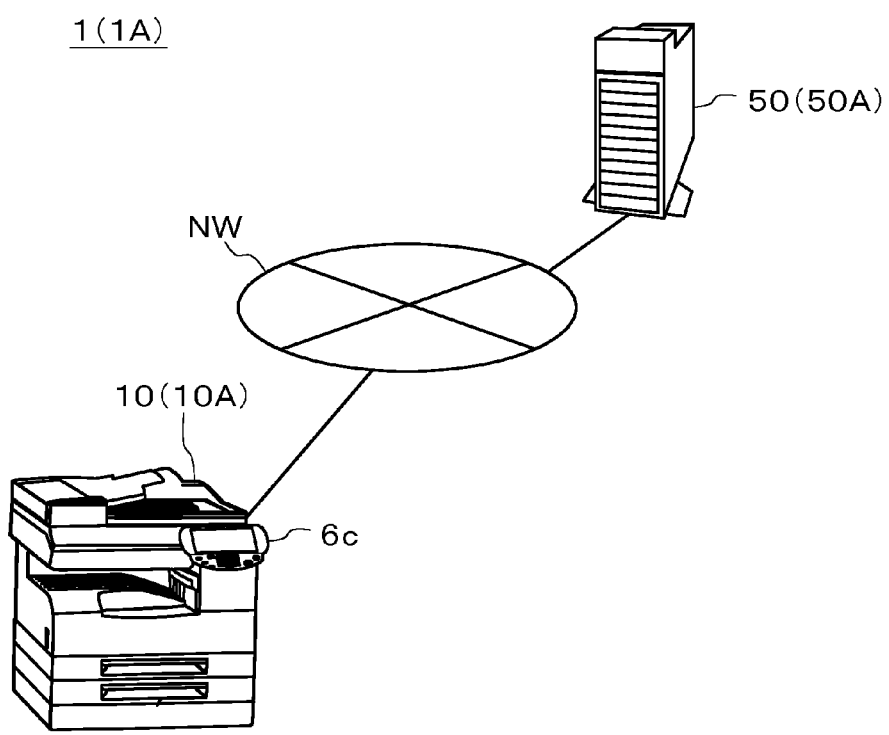
FIG. 1 illustrates a schematic configuration of an image forming system.

FIG. 1 illustrates a schematic configuration of an image forming system 1 (also called "1A"). As illustrated in FIG. 1, the image forming system 1 includes an image forming apparatus 10 (also called "10A") and a server computer (also referred to as a "server apparatus") 50 (also called "50A"). Here, a mode is illustrated in which, in the image forming system 1, the image forming apparatus 10 forms (generates) a scanned image using its scan function and transmits the scanned image to the server computer 50, and the server computer 50 distributes the scanned image to a desired destination. The server computer 50 controls, for example, an operation of changing various types of settings for the scan operation in cooperation with a web browser that is executed in the image forming apparatus 10. Various types of setting operations for the scan operation are carried out using an operation panel unit 6c of the image forming apparatus 10.

The image forming apparatus 10 and the server computer 50 are connected to each other via a network NW. The network NW is, for example, a local area network (LAN) or the Internet. A mode of connection to the network NW may be cable connection or wireless connection.

Figure 2:
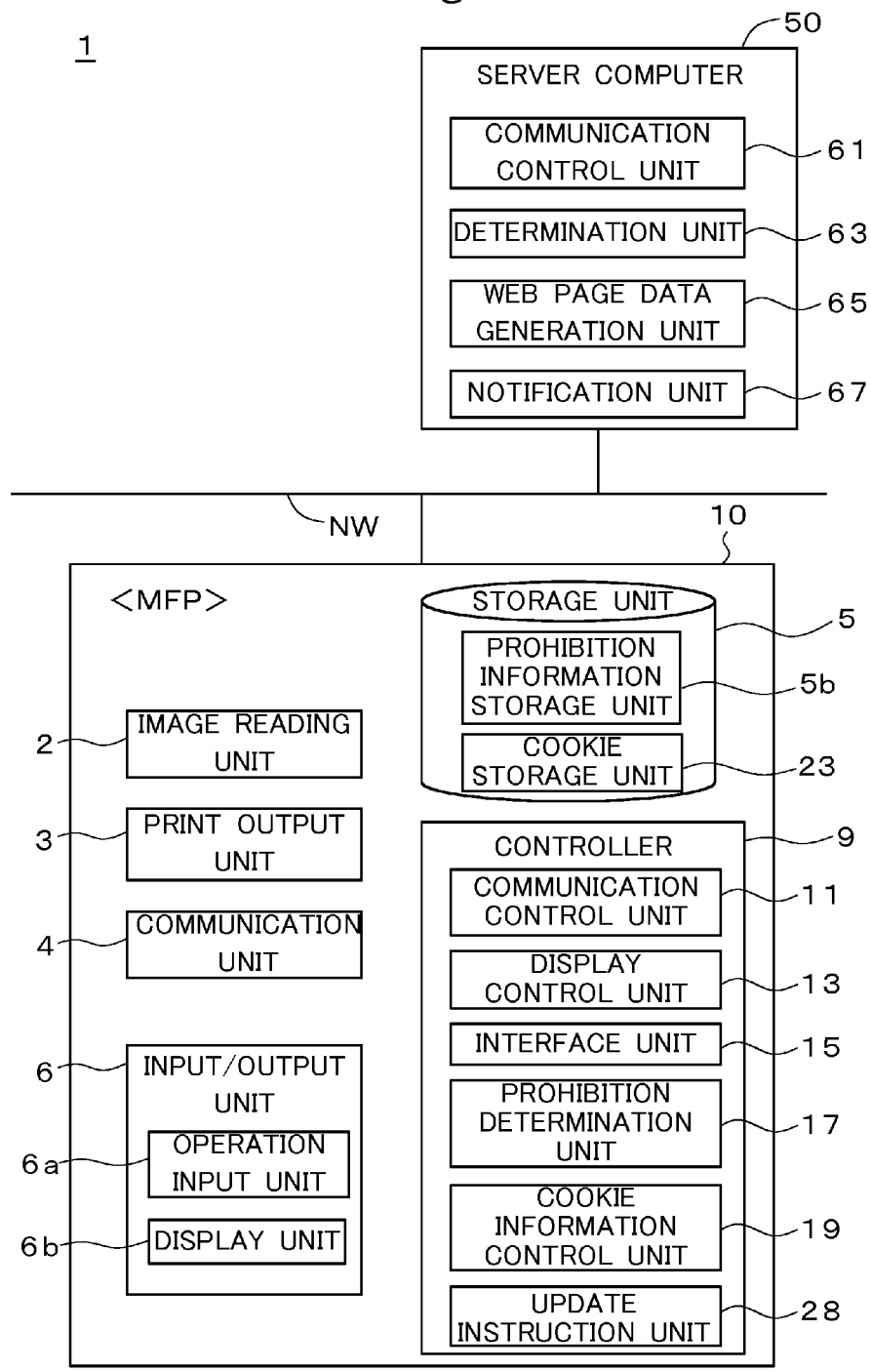
FIG. 2 is a functional block diagram of an image forming apparatus and a server computer.

FIG. 2 illustrates functional blocks of the image forming apparatus 10 and the others. In the present embodiment, a Multi-Functional Peripheral (MFP) is illustrated as an example of the image forming apparatus 10. In FIG. 2, the functional blocks of the MFP 10 are illustrated.

The MFP 10 is an apparatus having functions such as a scan function, a copy function, a facsimile function, and a box storage function (also called "Multi-Functional Peripheral"). Specifically, as illustrated in the functional block diagram of FIG. 2, the MFP 10 includes, for example, an image reading unit 2, a print output unit 3, a communication unit 4, a storage unit 5, an input/output unit 6, and a controller 9 and realizes various types of functions by operating these units in combination.

The image reading unit 2 is a processing unit configured to optically read (i.e., scan) an original document that is placed at a predetermined position on the MFP 10, and generate image data of the original document (also referred to as an "original image" or a "scanned image"). The image reading unit 2 is also called a "scanning unit".

The print output unit 3 is an output unit configured to print out an image on various types of media such as paper, based on data regarding an object to be printed.

The communication unit 4 is a processing unit capable of facsimile communication via a public network or the like. The communication unit 4 is also capable of network communication via the network NW. In the network communication, various types of protocols such as TCP/IP (Transmission Control Protocol/Internet Protocol) are used, for example. Using the network communication enables the MFP 10 to exchange various types of data with a desired party (e.g., server computer 50).

The storage unit 5 is constituted by a storage device such as a hard disk drive (HDD). The storage unit 5 stores data regarding a print job. The storage unit 5 is provided with a prohibition information storage unit 5b and a cookie storage unit 23.

The prohibition information storage unit 5b stores prohibited combination information MP (described later) regarding various types of settings.

The cookie storage unit 23 stores a cookie used for exchanging data between the web browser and the web server.

The input/output unit 6 includes an operation input unit 6a configured to accept input to the MFP 10, and a display unit 6b configured to display and output various types of information. The MFP 10 also includes the operation panel unit 6c (see FIGS. 1 and 6) that is provided with a touch screen (also called a "touch panel") 6d (see FIG. 6) and various types of hardware keys (hardware buttons) 6e. The touch screen 6d is constituted by embedding a piezoelectric sensor or the like in a liquid crystal display panel. The touch screen 6d functions as part of the display unit 6b and also functions as part of the operation input unit 6a. The hardware keys 6e function as part of the operation input unit 6a.

The operation of changing settings for the scan operation is primarily executed using the operation input unit 6a (specifically, operation panel unit 6c).

The controller 9 is a control device that is built into the MFP 10 and performs overall control of the MFP 10. The controller 9 is configured as a computer system that includes, for example, a CPU and various types of semiconductor memories (RAM and ROM). The controller 9 realizes various types of processing units by the CPU executing a predetermined software program (hereinafter, also simply referred to as a "program") PG1 stored in a ROM (e.g., EEPROM). Note that this program (specifically, a group of program modules) PG1 may be installed in the MFP 10 via a portable recording medium such as a USB memory (in other words, various types of computer-readable non-transitory recording media) or via the network NW or the like.

Specifically, as illustrated in FIG. 2, the controller 9 realizes various types of processing units including a communication control unit 11, a display control unit 13, an interface unit 15, a prohibition determination unit 17, and a cookie information control unit 19. These processing units are implemented on an operating system (OS) (software implementation).

The display control unit 13 is a processing unit configured to control a display operation in the display unit 6b (e.g., touch screen 6d). Using a web browser 21 (see FIG. 3) that communicates with a web server 71 in the server apparatus 50, the display control unit 13 displays a user interface screen UG (see FIGS. 6, 7, and 12) on the touch screen 6d, based on web page data that is received from the web server 71.

The interface unit 15 is a reception processing unit configured to receive an input for changing settings for a plurality of setting items regarding the image forming apparatus 10, from an operation user, using the user interface screen UG.

The prohibition determination unit 17 is a processing unit configured to determine whether or not two or more settings that are prohibited from being combined are included in a plurality of current settings (including a content of the change of settings received using the user interface screen UG). The prohibition determination unit 17 determines this matter based on the prohibited combination information MP stored in the prohibition information storage unit 5b.

Figure 3:
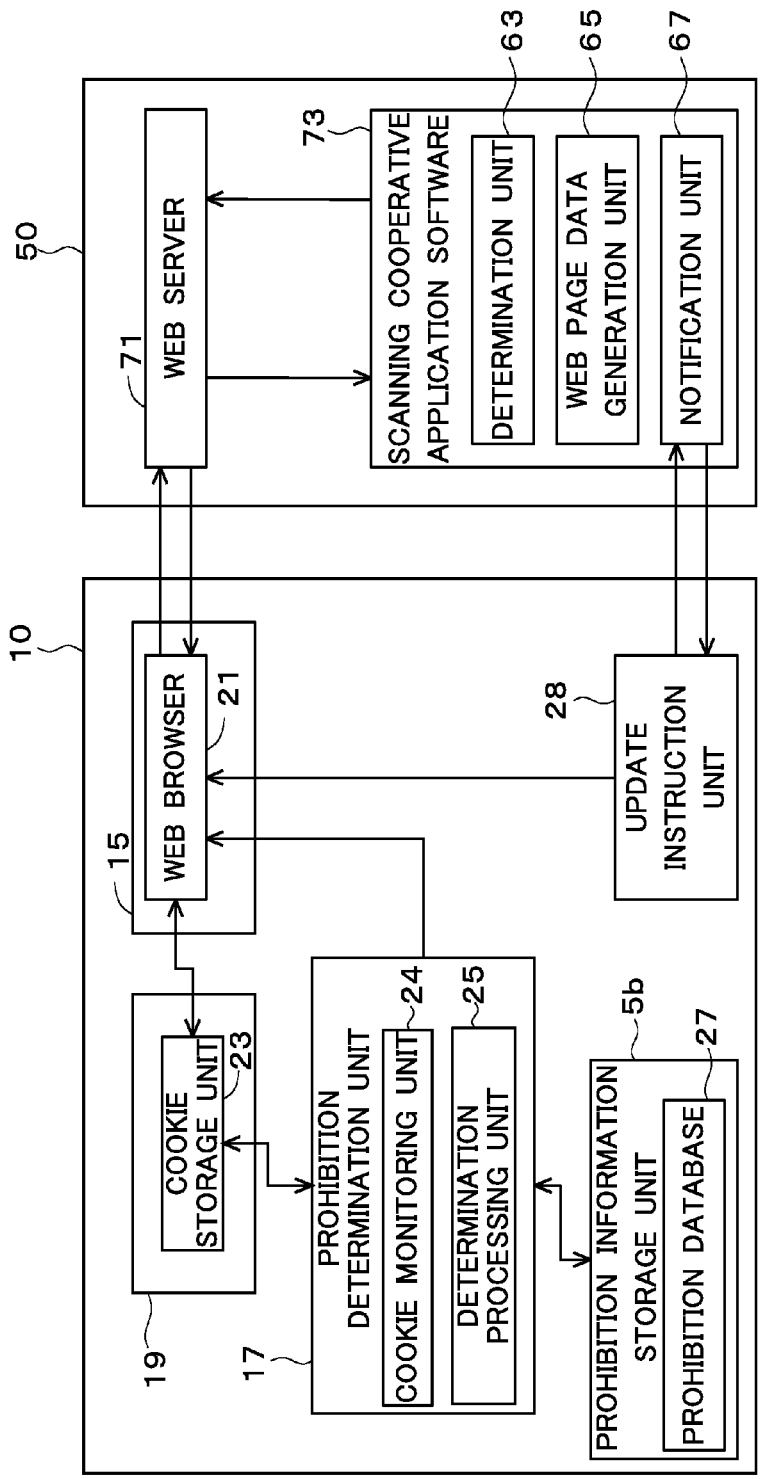
FIG. 3 illustrates more details of processing units of the image forming apparatus and the server computer.

The cookie information control unit 19 controls an operation of storing a plurality of current settings in the cookie storage unit 23. Also, in response to it having been determined that two or more settings that are prohibited from being combined are included in a plurality of current settings, the cookie information control unit 19 stores, in the "cookie" of the cookie storage unit 23, the fact that two or more settings that are prohibited from being combined are included in a plurality of current settings (FIG. 3). Note that, as will be described later, the information stored in the cookie is appropriately used to perform, for example, processing for updating a user interface.

The communication control unit 11 is a processing unit configured to control a communication operation with the server computer 50. The communication control unit 11 transmits the "cookie" to the web server in response to the prohibition determination unit 17 having determined that two or more settings that are prohibited from being combined are included in the current settings.

FIG. 3 illustrates more details of the processing units or the like realized by the image forming apparatus 10 and the server computer 50.

As illustrated in FIG. 3, the image forming apparatus 10 is provided with, for example, the web browser 21, the cookie storage unit 23, a cookie monitoring unit 24, a determination processing unit 25, a prohibition database 27, and an update instruction unit 28. Note that the prohibition determination unit 17, the cookie information control unit 19, and the update instruction unit 28 are each constructed as a module separate from the web browser 21 (provided independently).

The web browser 21 is a browsing program module for, for example, browsing web pages (pages described in Hypertext Markup Language (HTML)) on the World Wide Web (WWW). Note that, if web pages are constituted using also JavaScript (registered trademark) or the like, it is possible for the web browser 21 to execute various types of programs. In particular, using JavaScript or the like enables construction of an interface screen with a high degree of freedom.

The cookie storage unit 23 is a storage area for storing a cookie. The cookie storage unit 23 is a storage area under control of the web browser 21 (also called a "browser managing storage area") and is easily accessible from the web browser 21.

The prohibition database 27 (see also FIG. 13) stores the prohibited combination information (also referred to as "prohibition information") MP. The prohibited combination information MP is information about two or more settings regarding the image forming apparatus 10 (more specifically, two or more settings for two or more setting items regarding the image forming apparatus 10), the two or more setting items being prohibited from being set in combination with each other. The prohibition database 27 is constructed in the prohibition information storage unit 5b. For example, as illustrated in FIG. 13, the prohibition database 27 provides, for example, the fact that a combination of a setting "JPEG" for a setting item "file format" and a setting "monochrome binary" for a setting item "color setting" for the scan operation is prohibited in the image forming apparatus 10.

The cookie monitoring unit 24 and the determination processing unit 25 constitute part of the prohibition determination unit 17.

The cookie monitoring unit 24 is a processing unit configured to monitor the cookie storage unit 23. The cookie monitoring unit 24 monitors the cookie storage unit 23 at all times and detects the occurrence of a change in the content of the cookie. Upon detecting a change in the content of the cookie, the cookie monitoring unit 24 analyzes the storage content (content of the cookie) in the cookie storage unit 23 and acquires a plurality of current settings regarding the image forming apparatus 10.

The determination processing unit 25 is a processing unit configured to determine whether or not the current settings acquired by the cookie monitoring unit 24 include two or more settings that are prohibited from being combined.

The update instruction unit 28 is a processing unit configured to, upon receipt of a notification that display in the browser is to be updated from a notification unit 67 (described later), give a display update instruction based on the notification to the web browser 21. By giving this display update instruction, the update instruction unit 28 causes the web browser 21 to transmit a new Hypertext Transfer Protocol (HTTP) request (information transmission request) to the web server 71. Note that the update instruction unit 28 or the like may be configured using various types of application programming interfaces (API) such as "Open API."

FIGS. 2 and 3 also illustrate functional blocks of the server computer 50.

The server computer 50 is configured as a computer system that includes, for example, a CPU and various types of semiconductor memories (RAM and ROM). The server computer 50 realizes various types of processing units by the CPU executing a predetermined software program (hereinafter, also simply referred to as a "program") PG2. Note that the program (specifically, a group of program modules) PG2 may be stored in a portable recording medium such as a USB memory or a CD-ROM (in other words, various types of computer-readable non-transitory recording media), read from the recording medium, and installed into the server computer 50. Alternatively, the program PG2 may be downloaded via the network NW or the like and installed into the server computer 50.

Specifically, as illustrated in FIG. 3, the web server 71 and scanning cooperative application software (also referred to as "scanning cooperative software") 73 are constructed separately in the server computer 50. The scanning cooperative software 73 realizes the above-described processing (such as scanning processing and scanned image distribution processing) in cooperation with the web server 71.

The web server 71 is a program module (web server software) that transmits data of a specified web page to the web browser 21 in response to a request (e.g., HTTP request) from the web browser 21.

The scanning cooperative software 73 includes a determination unit 63, a web page data generation unit 65, and the notification unit 67.

The determination unit 63 is a processing unit configured to determine whether or not two or more settings that are prohibited from being combined are included in a plurality of current settings, based on the "cookie" transmitted from the web browser 21. If the "cookie" describes that two or more settings that are prohibited from being combined are included in the current settings, the determination unit 63 determines that fact.

The web page data generation unit 65 is a processing unit configured to generate web page data (e.g., HTML data). The web page data generation unit 65 generates web page data for warning screen display in response to the determination unit 63 having determined that two or more settings that are prohibited from being combined are included in the current settings.

The notification unit 67 is a processing unit configured to transmit a notification that the display in the web browser 21 is to be updated, to the image forming apparatus 10 (specifically, update instruction unit 28).

The communication control unit 61 (see FIG. 2) is a processing unit configured to control a communication operation between the server computer 50 and the image forming apparatus 10. The communication control unit 61 controls a communication operation between the notification unit 67 and the update instruction unit 28 and a communication operation between the web browser 21 and the web server 71. For example, the communication control unit 61 causes the notification unit 67 to give a notification to the update instruction unit 28, and also transmits the web page data for warning screen display to the web browser 21 in response to the HTTP request (information transmission request) transmitted from the web browser 21 in accordance with the notification.

2. Operations

Figure 4:
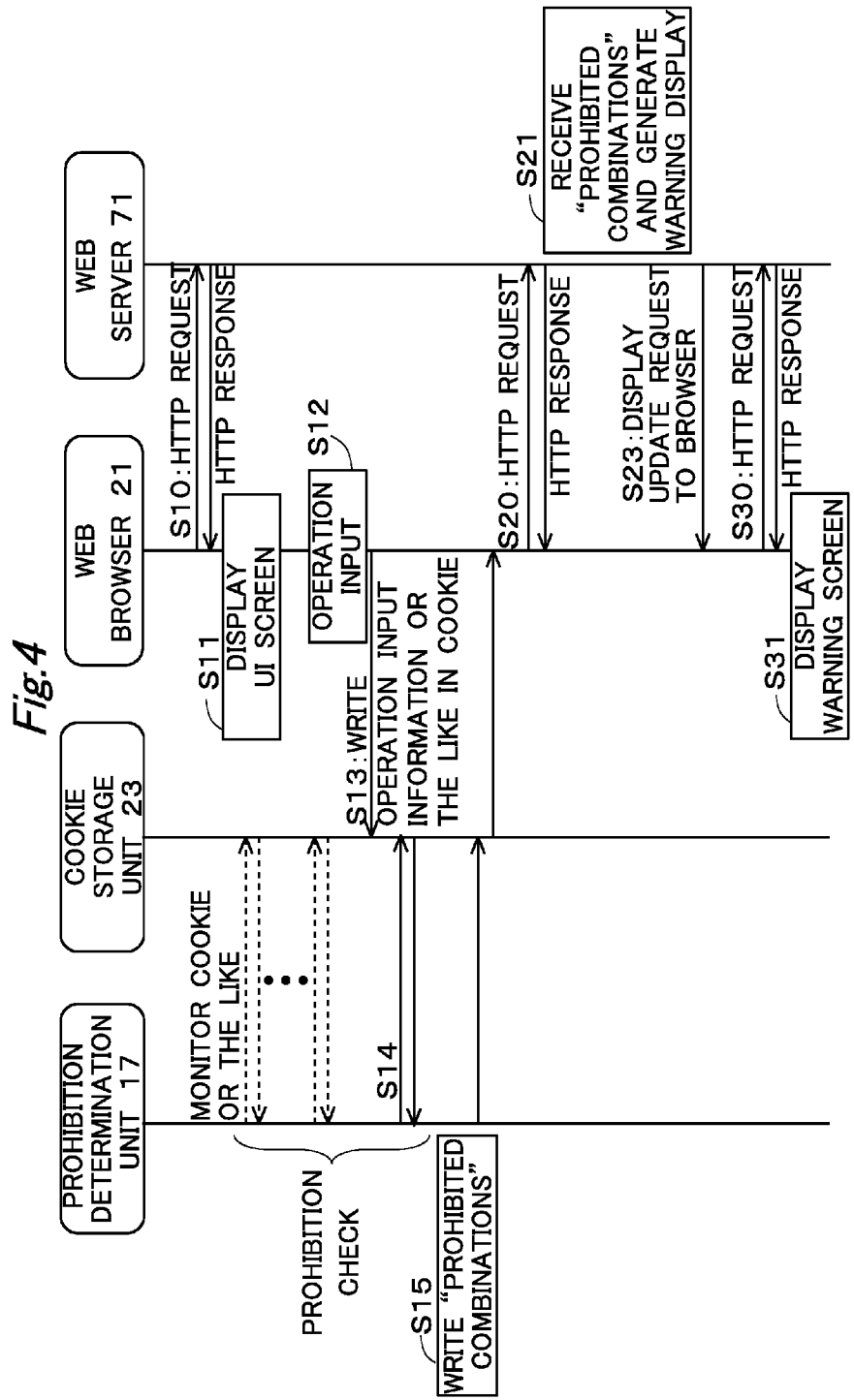
FIG. 4 is a sequence diagram illustrating operations performed by the image forming apparatus.

Next, operations performed by the image forming apparatus 10 will be described with reference to FIG. 4. FIG. 4 is a sequence diagram illustrating the operations performed by the image forming apparatus 10.

Figure 5:
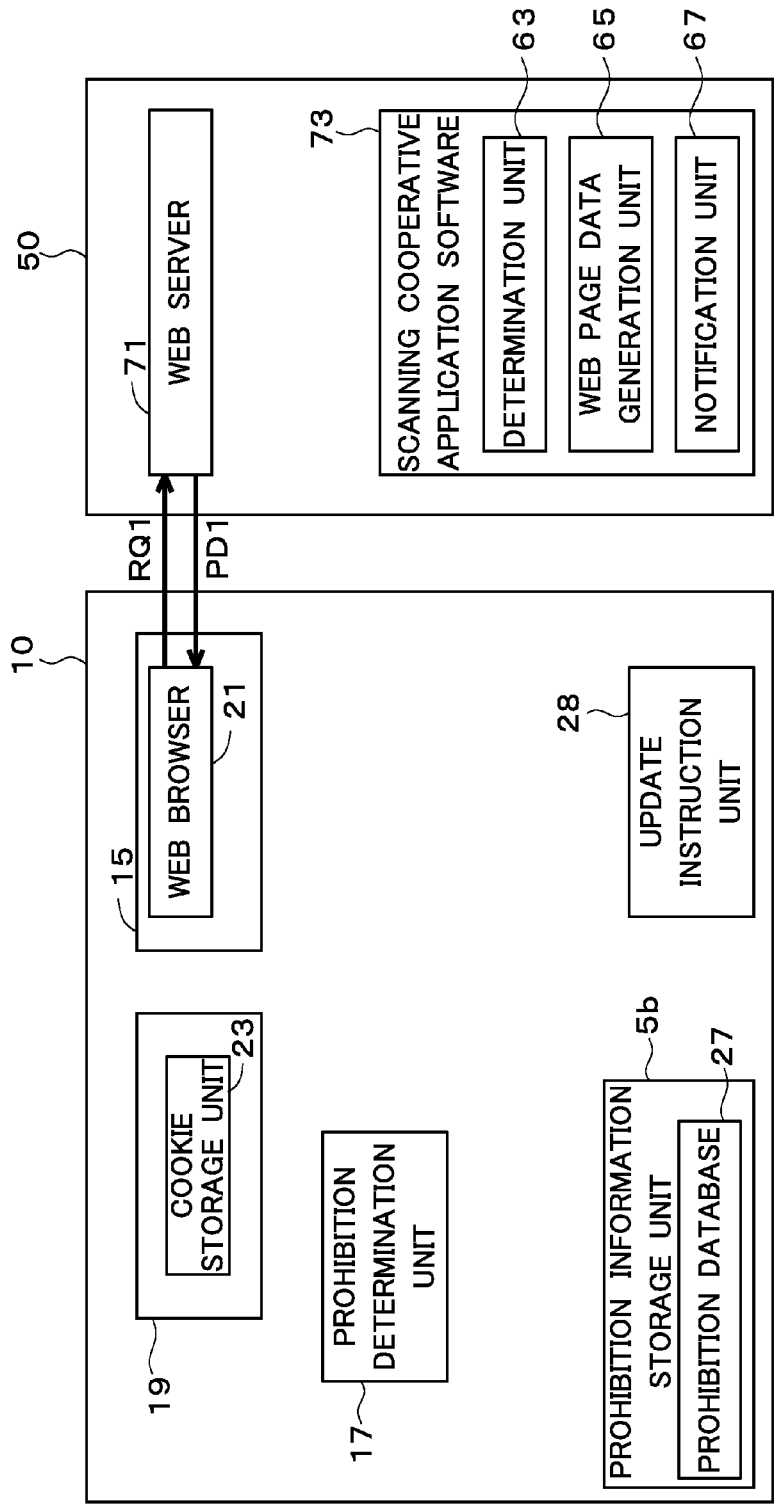

First, in step S10, the web browser 21 transmits an HTTP request (information transmission request) RQ1 to the web server 71, and the web server 71 returns an HTTP response to the web browser 21 (see also FIG. 5). Through this communication, the web browser 21 acquires web page data PD1 (web page data (e.g., HTML file) stored in a specific Uniform Resource Locator (URL)) that is returned from the web server 71 in response to the HTTP request RQ1. The web browser 21 then displays a user interface screen UG1 (see FIG. 6) based on the web page data PD1 (step S11).

Figure 6:
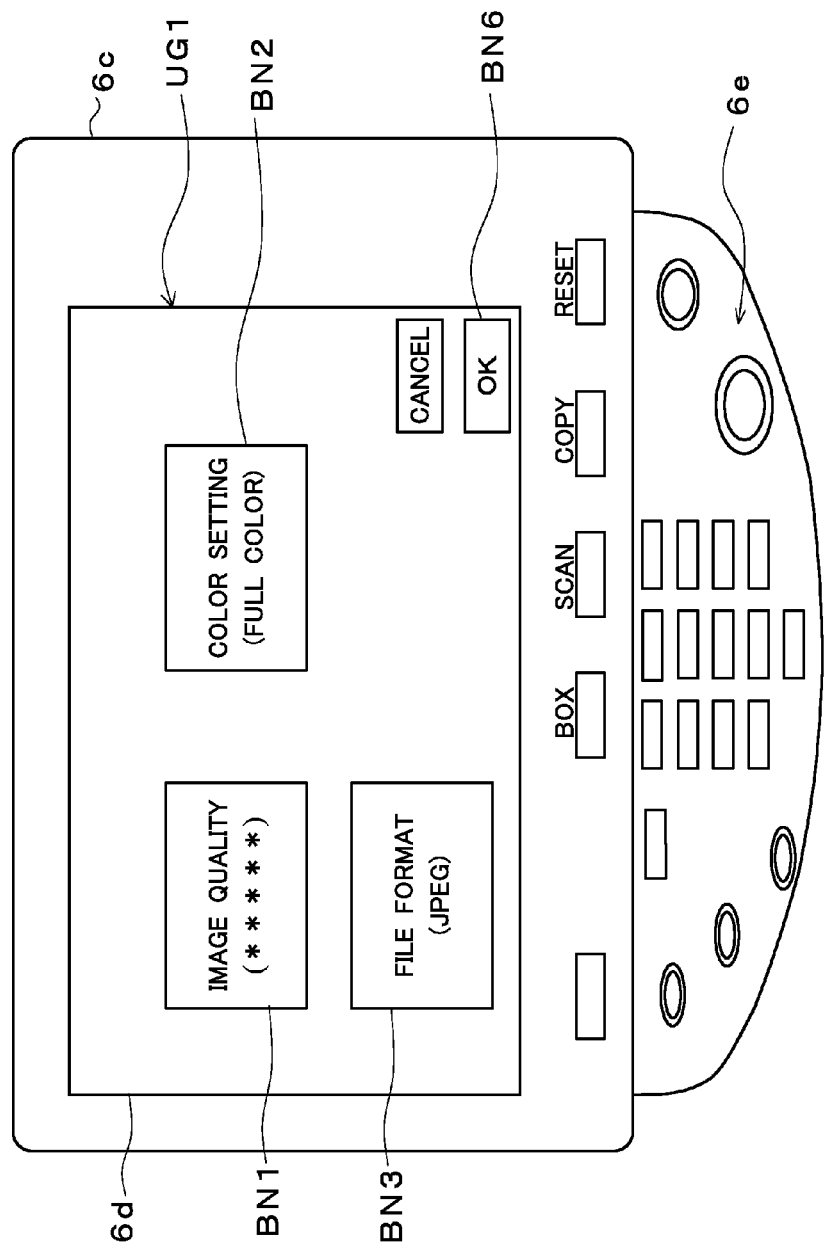
FIG. 6 illustrates a user interface screen.

FIG. 6 illustrates the operation panel unit 6c of the image forming apparatus 10. As illustrated in FIG. 6, the operation panel unit 6c is provided with the touch screen 6d and the various types of hardware keys (hardware buttons) 6e. In the touch screen 6d, various types of user interface screens UG are displayed. Here, a screen for setting the setting items for the scan operation is shown as the user interface screen UG1.

This screen UG1 includes an image quality setting button BN1, a color setting button BN2, and a file format setting button BN3. In accordance with the pressing of the buttons BN1, BN2, and BN3, submenus are displayed, and setting operations are accepted in the submenus.

Figure 7:
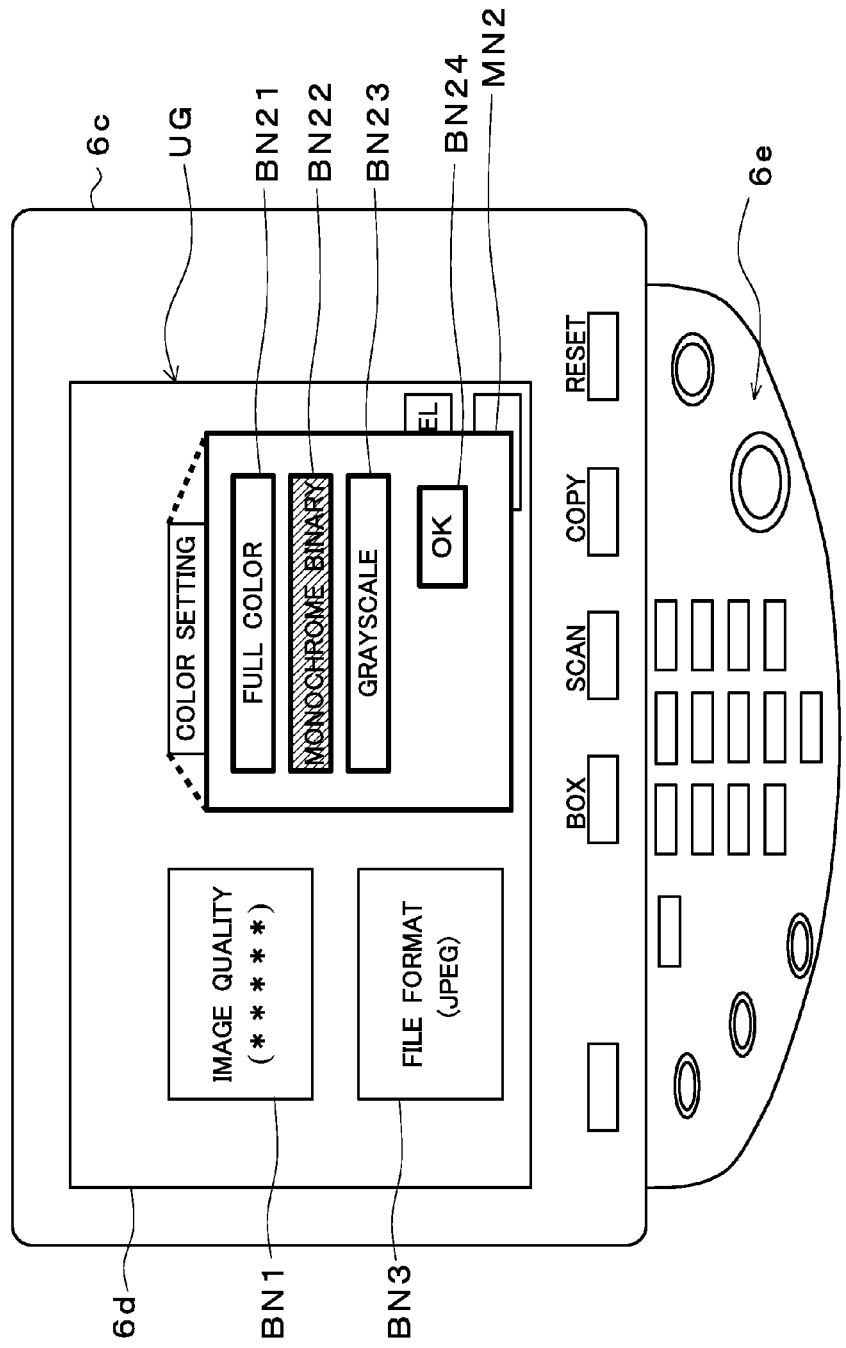
FIG. 7 illustrates a user interface screen.

For example, if the color setting button BN2 is pressed in the screen UG1, a popup menu MN2 as illustrated in FIG. 7 is displayed. Then, if one of a plurality of buttons BN21, BN22, and BN23 is pressed and then an OK button BN24 is pressed in the popup menu MN2, a content in accordance with the pressed button is set (step S12). For example, if the button BN22 is pressed, "monochrome binary" is set. Note that processing such as using the popup menu MN2 may be realized by, for example, using JavaScript or the like.

The same follows for the other buttons BN1 and BN3. If the image quality setting button BN1 is pressed, an operation of changing the setting for the setting item "image quality" (e.g., "photograph" or "character") can be performed. If the file format setting button BN3 is pressed, an operation of changing the setting for the setting item "file format" (e.g., "JPEG" or "PDF") can be performed.

Figure 8:
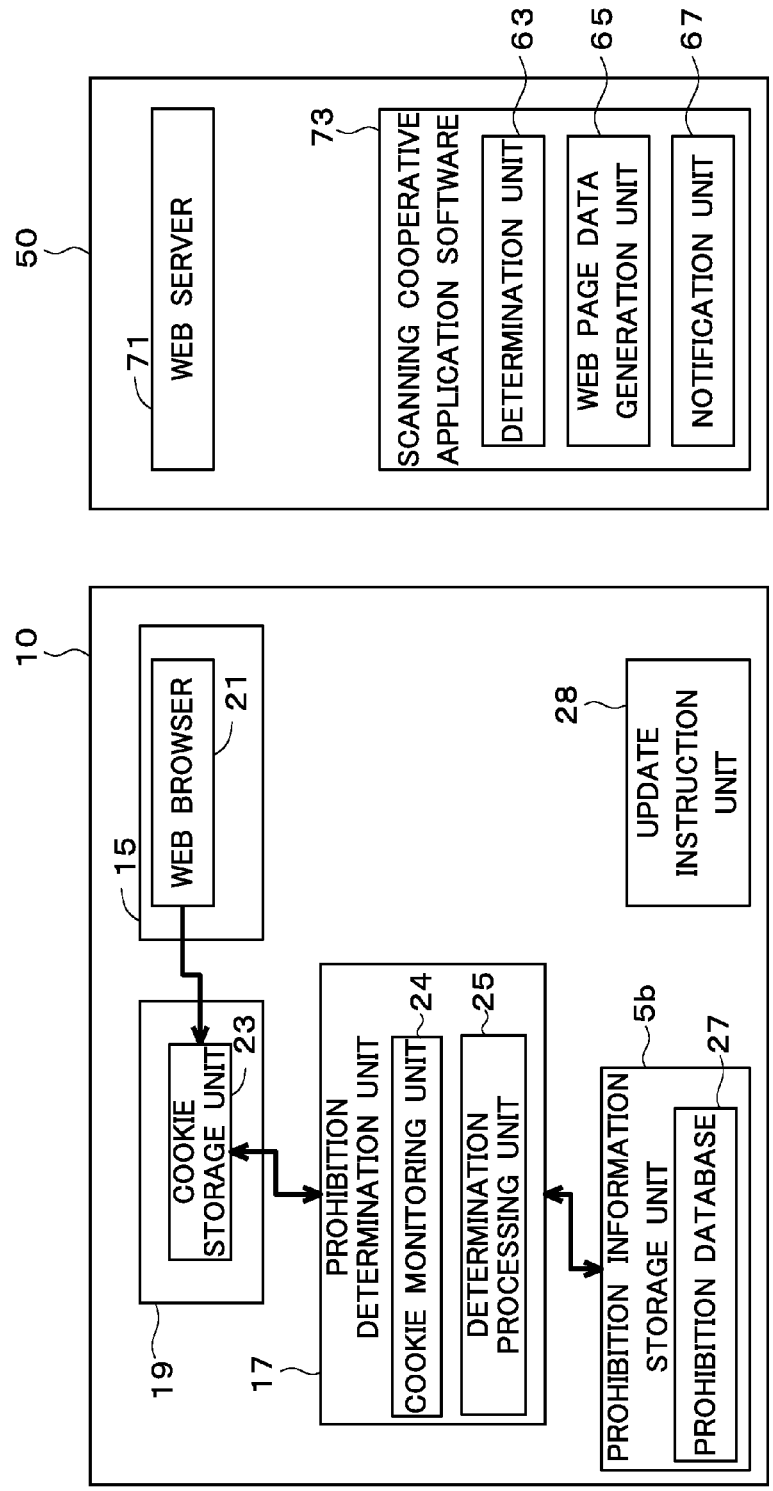
FIG. 8 is a conceptual diagram illustrating information transmission.

In accordance with such a change of the setting, the image forming apparatus 10 (specifically, cookie information control unit 19) stores a plurality of current settings (including the content of change of the setting accepted through the screen UG1) in the "cookie" of the cookie storage unit 23 in the web browser 21 (step S13) (see also FIG. 8). For example, if the setting regarding the color setting has been changed from "full color" to "monochrome binary," the fact that the changed setting "monochrome binary" is set for the setting item "color setting" is stored in the cookie of the cookie storage unit 23. Also, the information other than the changed setting is stored as-is. Specifically, the default setting "character" is stored for the setting item "image quality" in the "cookie" of the cookie storage unit 23, and the default setting "JPEG" is stored for the setting item "file format" in the "cookie" of the cookie storage unit 23.

Here, the cookie monitoring unit 24 (see also FIG. 8) of the prohibition determination unit 17 monitors the cookie of the cookie storage unit 23 at all times. When a change has been made to the content of the cookie, the determination processing unit 25 of the prohibition determination unit 17 checks based on the prohibition database 27 whether or not "settings that are prohibited from being combined" are included in the changed content. Specifically, the determination processing unit 25 determines, based on the prohibition information (prohibited combination information MP) in the prohibition database 27, whether or not two or more settings that are prohibited from being combined are included in the current settings that include the setting changed by the user operation (step S14).

For example, if the prohibition database 27 provides the fact that a combination of the following settings, "color setting=monochrome binary" and "file format=JPEG", is prohibited, the prohibition determination unit 17 determines that those two settings are "settings that are prohibited from being combined," based on that provision.

Then, upon acquiring the result of determination that the two settings are "settings that are prohibited from being combined" from the prohibition determination unit 17, the cookie information control unit 19 (see also FIG. 9) stores the fact that settings that are prohibited from being combined (settings "color setting=monochrome binary" and "file format=JPEG") are included in the current settings, in the "cookie" of the cookie storage unit 23, based on the determination result (step S15). Note that, as will be described later, the user interface screen UG can be updated using that "cookie" (specifically, by exchanging the cookie between the web browser 21 and the web server 71) (step S31).

Figure 9:
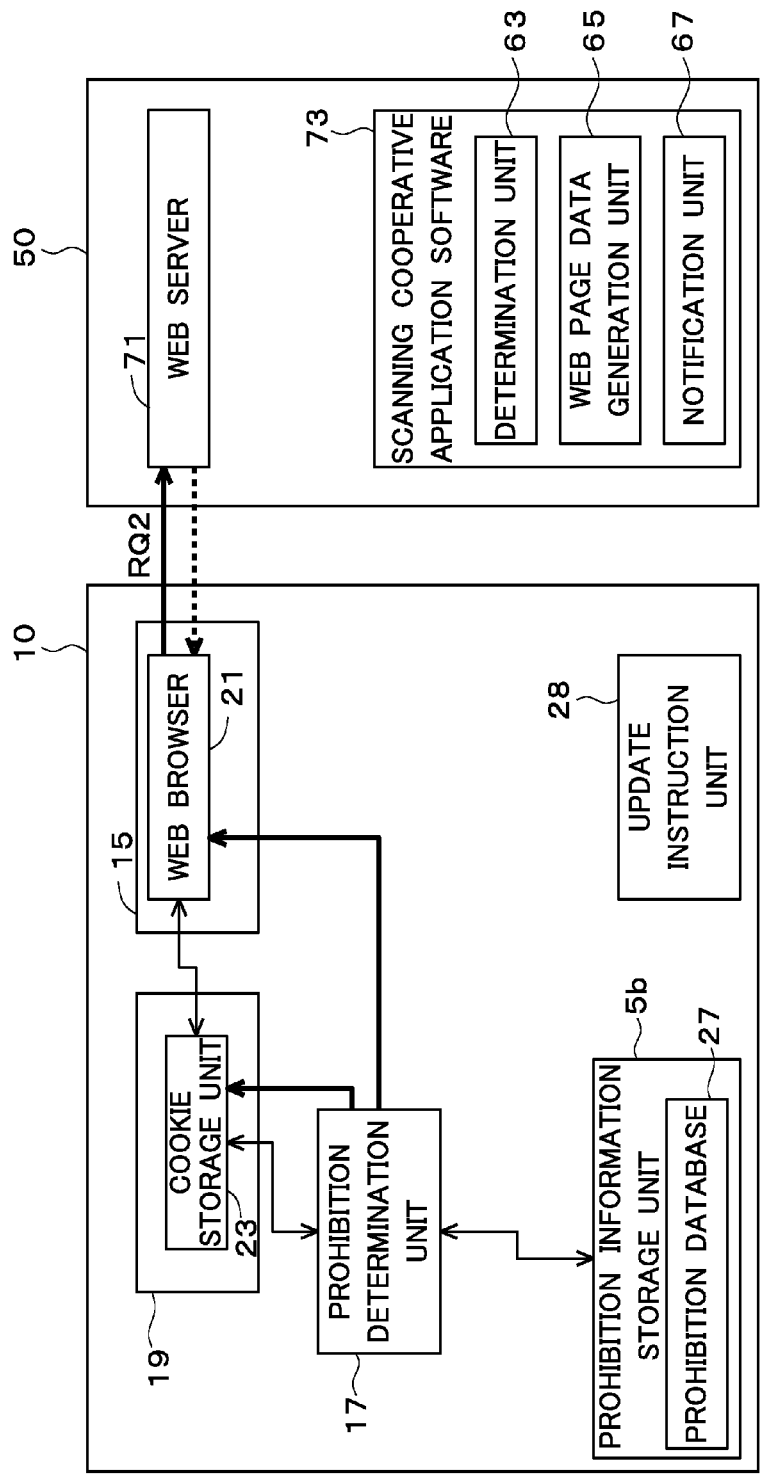
FIG. 9 is a conceptual diagram illustrating information transmission.

Next, the prohibition determination unit 17, the cookie information control unit 19, and the communication control unit 11 cause the web browser 21 to transmit an HTTP request RQ2 to the web server 71 in cooperation with one another (see also FIG. 9). Along with the HTTP request RQ2, the "cookie" is also transmitted from the web browser 21 to the web server 71 (step S20). Note that, at this time, an HTTP response is returned from the web server 71 to the web browser 21, and a display screen in the web browser 21 is updated. However, at this point in time, the screen UG1 similar to that in FIG. 6 is displayed as-is. While in the present example, the display screen is also updated in step S20, the present invention is not limited thereto, and the display screen may be not to be updated.

Figure 10:
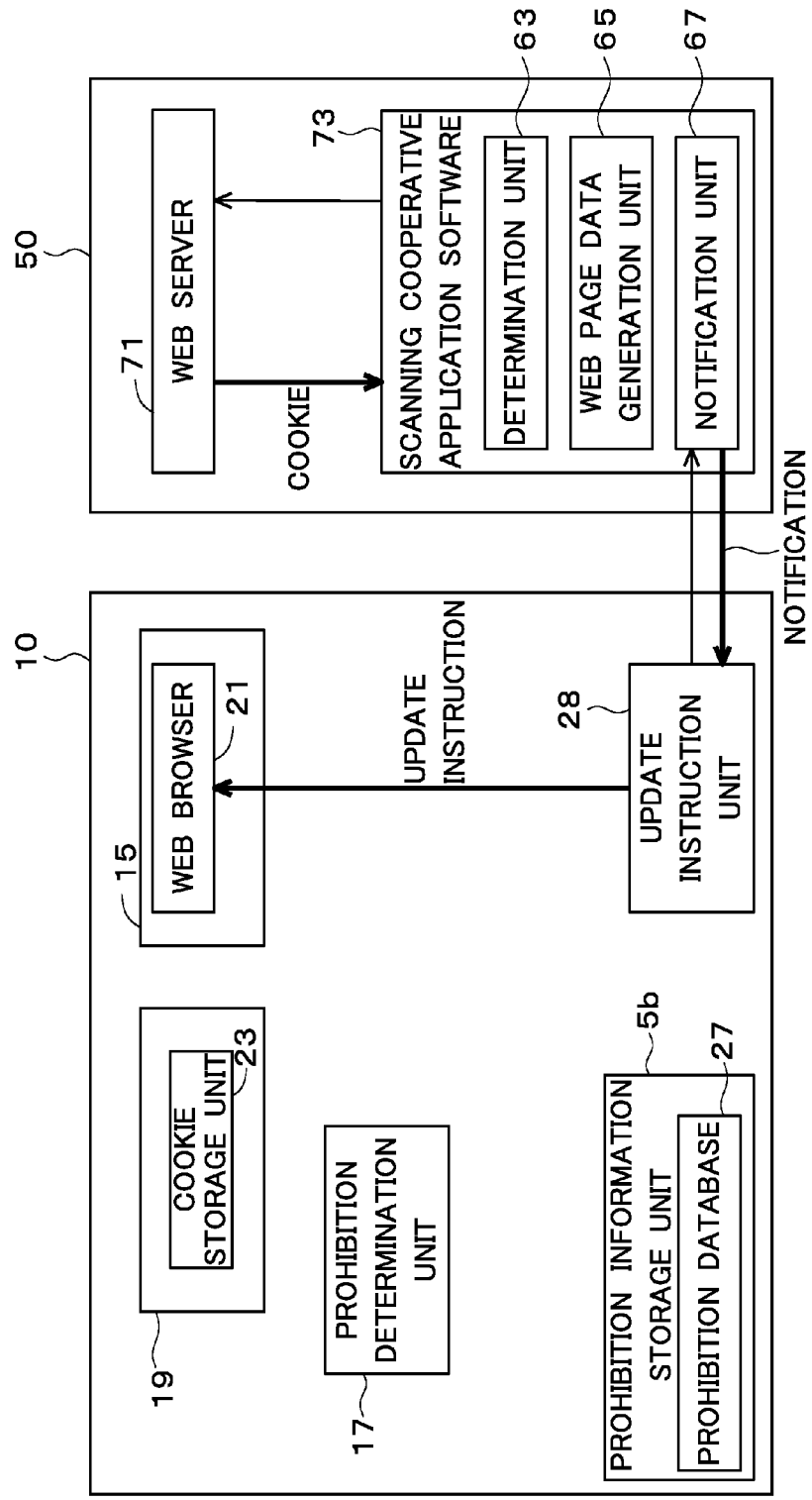
FIG. 10 is a conceptual diagram illustrating information transmission.

In step S21, the determination unit 63 of the server computer 50 receives the "cookie" from the web server 71 (see also FIG. 10). The determination unit 63 determines based on the cookie transmitted from the web browser 21 that two or more settings that are prohibited from being combined are included in the current settings regarding the image forming apparatus 10.

Furthermore, in response to the determination unit 63 having determined that two or more settings that are prohibited from being combined are included in the current settings, the server computer 50 (specifically, web page data generation unit 65) generates web page data PD3 for warning screen display. The generated web page data PD3 is stored in a location indicated by a predetermined URL. Note that the predetermined URL may be the same as that of the original web page data, or may be different from that of the original web page data.

After the web page data PD3 for warning screen display has been generated, then in step S23, the notification unit 67 of the server computer 50 transmits a notification that the display in the web browser is to be updated (display update request notification) to the update instruction unit 28 in the image forming apparatus 10, in order to change the display content in the web browser 21 to a warning display (see also FIG. 10). That notification involves specifying the URL of the web page data PD3 to be displayed. Upon receipt of the notification from the notification unit 67, the update instruction unit 28 gives an update instruction (display update instruction) to the web browser 21 in accordance with the notification (see also FIG. 10).

Figure 11:
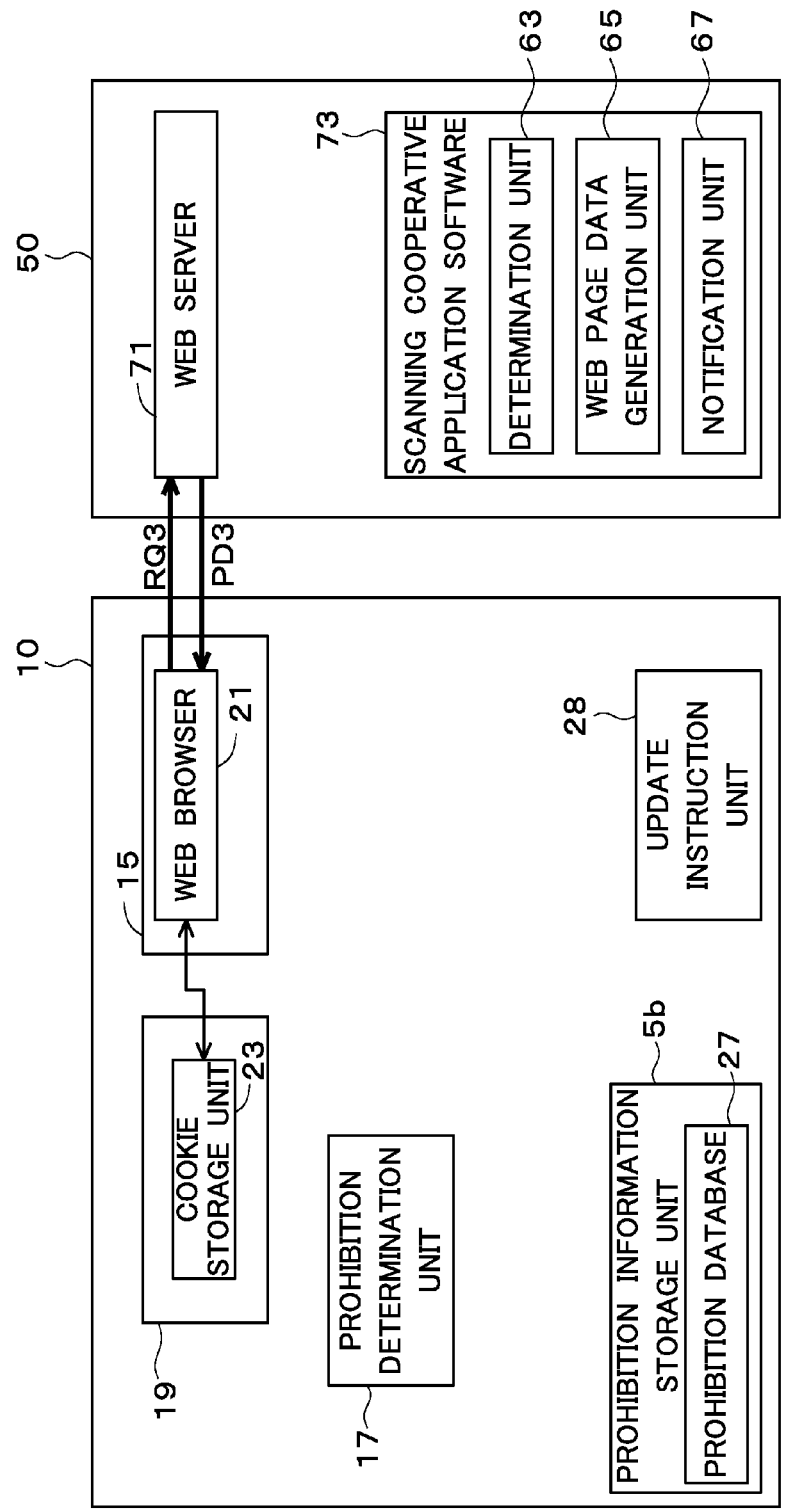
FIG. 11 is a conceptual diagram illustrating information transmission.

The web browser 21 transmits an HTTP request RQ3 regarding the specified URL to the web server 71, based on the update instruction (step S30). Meanwhile, the web server 71 returns an HTTP response to the HTTP request RQ3 to the web browser 21 (see also FIG. 11). In other words, in response to the HTTP request RQ3 (information transmission request transmitted from the web browser 21 in accordance with the notification from the notification unit 67), the web server 71 transmits the web page data PD3 for warning screen display to the web browser 21. Through this communication, the web browser 21 acquires the web page data PD3 that is returned from the web server 71 in response to the HTTP request RQ3, and updates and displays a user interface screen UG3 (see FIG. 12) based on the web page data PD3 (step S31).

Figure 12:
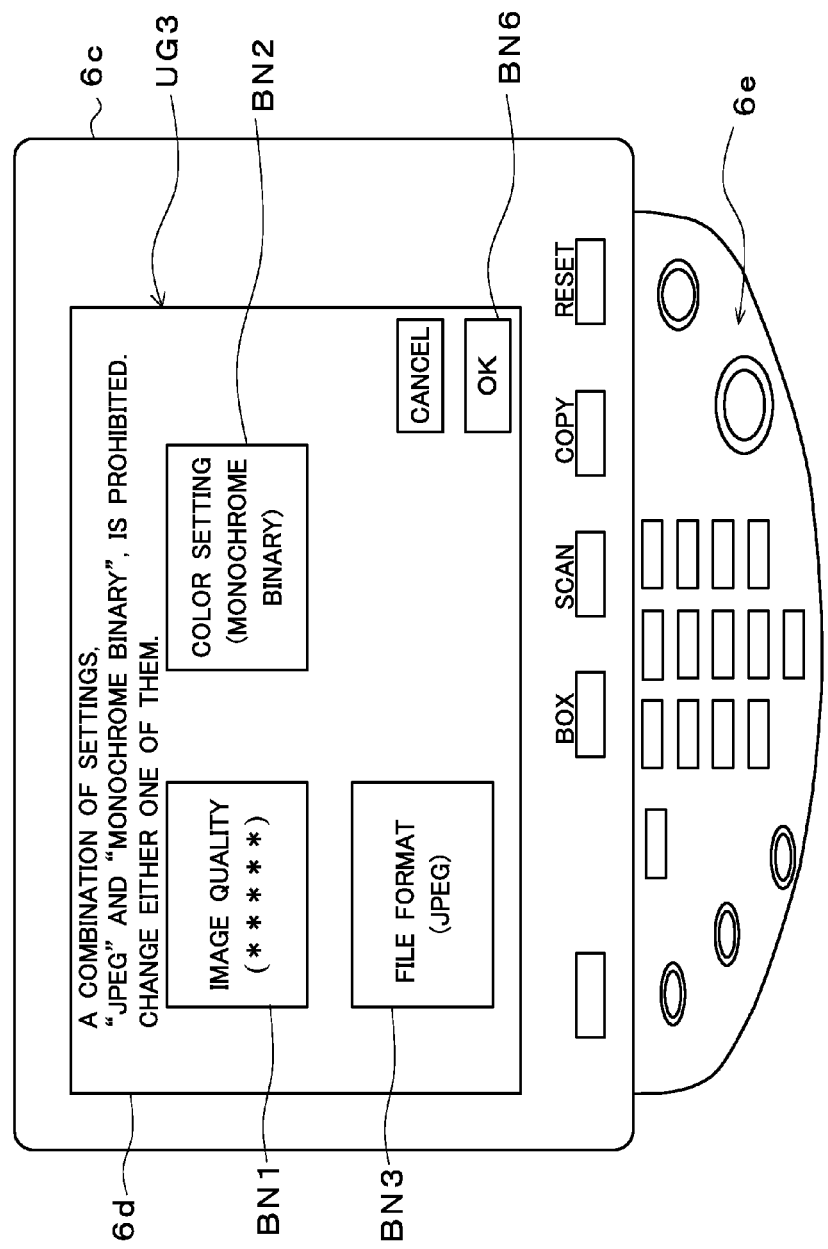
FIG. 12 illustrates a user interface screen.

FIG. 12 illustrates a user interface screen regarding settings items for the scan operation. This user interface screen UG3 contains a warning about settings that are prohibited from being combined. Specifically, a warning expressed by a character string that reads "A combination of settings "JPEG" and "monochrome binary" is prohibited. Change either one of them" is included in the upper portion of the user interface screen UG3. Thus, the user interface screen UG3 is also referred to as a warning display screen.

In this way, the user is informed in real time of the fact that a combination of the settings, "color setting=monochrome binary" and "file format=JPEG", is prohibited from being combined. In other words, the display control unit 13 acquires, via the "cookie", the fact that two or more settings that are prohibited from being combined are included in the current settings, and updates the user interface screen UG.

If the operator has acquired through visual recognition of the screen UG3 that the settings are prohibited from being combined, the operator is capable of performing resetting using the screen UG3. For example, if the operator presses the color setting button BN2, a popup menu is displayed and another option such as "gray scale" can be selected using the popup menu. Also, in according with this change of the setting, the content of the cookie in the cookie storage unit 23 is changed (updated). Note that because the user interface screen UG3 is a setting screen for resetting, it is also referred to as a resetting screen (or setting screen).

More specifically, processing similar to that of the above-described steps S10 to S31 is executed.

However, in processing similar to that of steps S13 to S15, conversely at this time, the fact that "two or more settings that are prohibited from being combined are included in the current settings" is deleted from the cookie. More specifically, after the setting has been changed again and stored in the cookie, the cookie monitoring unit 24 detects that a change has been made again to the content of the cookie, and then, the fact that "two or more settings that are prohibited from being combined are included in the current settings" is deleted from the cookie, based on the setting that has been changed again and stored in the cookie.

Thereafter, in response to the change that was made again, the cookie is transmitted together with the HTTP request RQ2 to the web server 71, and the determination unit 63 determines based on the cookie that the current settings do not include two or more settings that are prohibited from being combined." Then, the web page data generation unit 65 and the notification unit 67 specify the URL of the original web page data PD1 and transmit a notification that the display in the web browser is to be updated to the update instruction unit 28. The web browser 21 transmits an HTTP request regarding the original URL based on the update instruction given from the update instruction unit 28 in accordance with the notification, and receives the web page data PD1 regarding the original URL. As a result, in the web browser 21, the screen UG1 based on the original web page data PD1 (or a screen similar to the screen UG1) is displayed in replacement of the screen UG3 based on the web page data PD3 for warning.

Thereafter, if an OK button BN6 (see FIG. 6) is pressed, an instruction to complete the operation of setting a plurality of setting items for the scan operation is considered to be given, and the scan operation is executed. In this scan operation, the settings in the user interface screen UG are reflected.

Then, a scanned image acquired by the scan operation is transmitted from the image forming apparatus 10 to the server computer 50. Thereafter, the server computer 50 distributes the scanned image to a desired distribution destination.

As described above, according to the above-described embodiment, an input for changing settings using the user interface screen UG1 is received, and it is determined based on the prohibited combination information MP whether or not two or more settings that are "prohibited from being combined" are included in a plurality of current settings that include the setting changed as a result of the input for changing settings (step S15). Furthermore, in response to it having been determined that "the settings include two or more settings that are prohibited from being combined," that fact is stored in the cookie (data in the storage area under control of the web browser) of the cookie storage unit 23. In other words, prohibition detection information (the fact that prohibition processing (combination prohibiting processing) has been detected) is stored in the cookie. Then, based on the prohibition detection information, the interface screen UG1 is updated to the new interface screen (warning screen) UG3.

By in this way determining settings that are prohibited from being combined based on the prohibited combination information MP stored on the image forming apparatus 10 side (steps S14 and S15), it is possible for the system as a whole to take combination prohibiting processing into consideration. On the other hand, the server apparatus side is not required to consider many different kinds of combination prohibiting processing (in particular, incorporate prohibited combination determination processing in the server application software). Accordingly, the number of man-hours required to consider prohibited combination information regarding each of many different kinds of models can be reduced in the development of the server application software. By extension, the image forming system can be relatively easily constructed. In particular, efficient system construction is possible because it is not required to incorporate the prohibited combination determination processing into both of the image forming apparatus 10 and the server apparatus 50 and it is sufficient to incorporate the prohibited combination determination processing into only the image forming apparatus 10.

In particular, in view of the circumstances where the prohibition processing (combination prohibiting processing) by MFPs varies depending on the model, the number of man-hours required to develop the server application software that is compatible with a plurality of models of the image forming apparatus 10 can be considerably reduced, which is very useful.

In the above-described embodiment, the user interface screen is updated by utilizing predetermined data ("cookie") in which the fact that "two or more settings that are prohibited from being combined are included in a plurality of current settings" is recorded. In other words, the fact that two or more settings that are prohibited from being combined are included in the current settings is transmitted via predetermined data (in short, mechanism of the existing "cookie") in the existing cookie storage unit 23 under control of the web browser 21, and the user interface is updated. Accordingly, the image forming system can be easily constructed.

In particular, because the prohibition determination unit 17 is provided separately from the web browser 21 (browser module), the web browser module itself is prevented from being changed. Therefore, the image forming system can be more easily constructed than in the case where a change of the web browser is involved.

Furthermore, in the above-described embodiment, in response to the pressing of a button in the interface screen UG1 of the web browser, the HTTP request RQ2 is transmitted from the web browser 21 to the web server 71, and the "cookie" is transmitted together with the request RQ2 from the web browser 21 to the web server 71. That is, in response to the input for changing settings using the interface screen UG1, the fact that two or more settings that are prohibited from being combined are included in the current settings is transmitted in real time to the web server. In other words, the web server is notified of that fact immediately after the input for changing settings. By extension, it is possible to immediately display the interface screen UG3 reflecting that fact.

This allows the operator to know the presence of settings that are prohibited from being combined, in advance before pressing the OK button BN6. Accordingly, operability of the operator can be improved as compared with the case where the operator can know the presence of settings that are prohibited from being combined, only after having pressed the OK button BN6. In other words, it is possible to avoid stress (sense of displeasure) that the operator may feel with the technique (comparative example) in which the operator can know the presence of settings that are prohibited from being combined, only after having pressed the OK button BN6. That is, it is possible to early and appropriately send to the operator a notification that the settings made by the operator are prohibited from being combined.

3. Variations

While the above has been a description of an embodiment of the present invention, the present invention is not intended to be limited to the details described above.

For example, while in the above-described embodiment, a mode is illustrated in which the web server and the scanning cooperative application software are provided in the single server 50, the present invention is not limited thereto, and the web server 71 and the scanning cooperative application software 73 may be provided separately in a plurality of server computers 50 (e.g., 50a and 50b).

In the above-described embodiment, a cookie that includes the prohibition detection information is transferred along with the HTTP request RQ2 from the web browser 21 to the web server 71, and the web page data generation unit 65 generates a warning page based on the determination result obtained from the determination unit 63. Thereafter, through the processing of the notification unit 67 and the update instruction unit 28, the HTTP request RQ3 is transmitted again from the web browser 21 to the web server 71, whereby the screen UG in the web browser 21 is updated. In this way, a user interface screen is updated using the cookie including the prohibition detection information.

However, the present invention is not limited thereto. For example, a user interface screen UG may be updated without the new HTTP requests RQ2 and RQ3 being transmitted from the web browser 21 to the web server 71.

Specifically, first, part of the web page data displayed in the web browser 21 (HTML data that is temporarily stored in the web browser 21) is directly edited (rewritten). More specifically, the HTML data is updated by adding, to the HTML data, tag data or the like for displaying a message such as "A combination of settings "JPEG" and "monochrome binary" is prohibited. Change either one of them." Next, the display content in the web browser 21 is updated by specifying the URL (URL in the image forming apparatus 10) of the storage location of the edited HTML data that is temporarily stored. As a result, the display content in the web browser 21 is updated and displayed based on the edited web page data. In this fashion, the user interface screen UG may be updated using the cookie including the prohibition detection information.

While in the above-described embodiment, a cookie storage area is illustrated as an example of the browser managing storage area, the present invention is not limited thereto, and for example, Web Storage in HTML5 may be used as the browser managing storage area. Similarly, as the data in the browser managing storage area, "storage data" in the above-described Web Storage may be used instead of the "cookie." Note that in the case of using Web Storage, storage data may be appropriately transmitted or received using Ajax communication.

While in the above-described embodiment, a mode is illustrated in which it is determined based on the prohibited combination information MP whether or not the combination of the setting "JPEG" for the setting item "file format" and the setting "monochrome binary" for the setting item "color setting" for the scan operation is included in the current settings, the present invention is not limited thereto. Other combinations of a plurality of setting items, e.g., a combination of a setting "searchable PDF" for the setting item "file format" and a setting "high resolution (600 dpi)" for the setting item "resolution" may be stored as settings "that are prohibited from being combined" in the prohibited combination information MP. Then, whether or not these settings "that are prohibited from being combined" are included in the current settings may be determined based on the prohibited combination information MP. Note that "searchable PDF" refers to a portable document format (PDF) file format in which text information as a result of optical character recognition (OCR) is pasted, and there are cases, depending on the memory capacity or the like loaded in the image forming apparatus 10, where a combination of the setting "searchable PDF" and the setting "high resolution (600 dpi)" is prohibited.

While in the above-described embodiment, the server cooperative application software illustrated is configured to acquire the scanned image generated by the image forming apparatus 10 and distribute the scanned image to a predetermined distribution destination, the present invention is not limited thereto.

Figure 14:
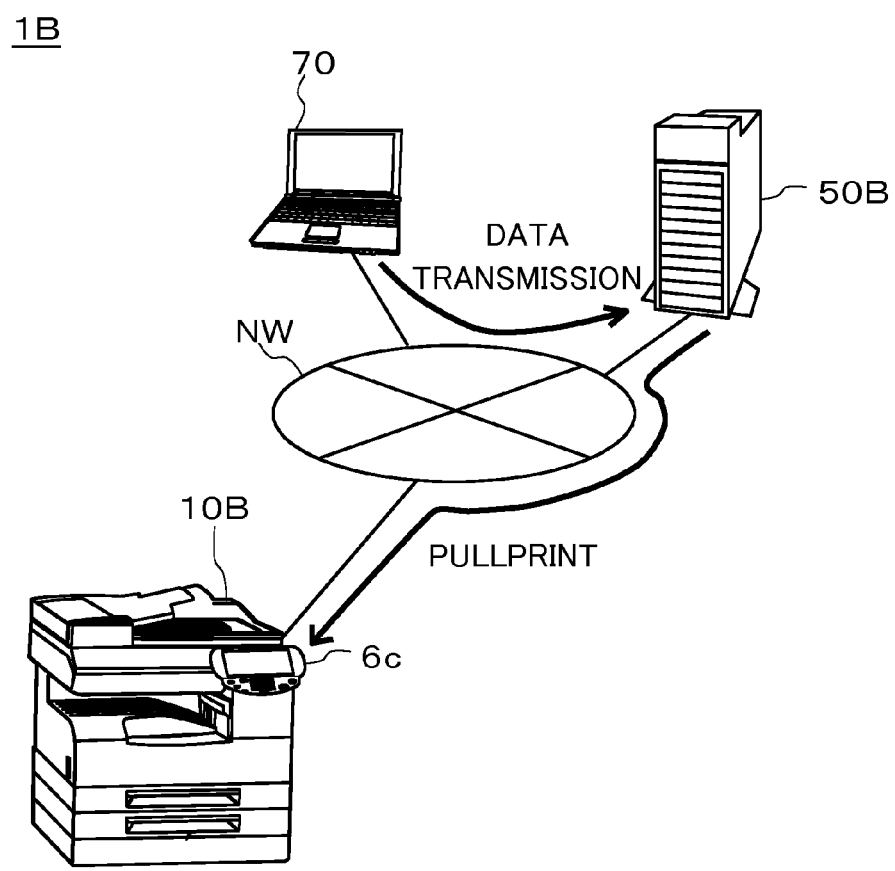
FIG. 14 illustrates a configuration according to a variation.

For example, as illustrated in FIG. 14, the above-described idea may be applied to a "PullPrint system" (image forming system) 1B in which an MFP 10 (also called "10B") and a server apparatus 50 (also called "50B") operate in cooperation with each other. The MFP 10B and the server 50B respectively have similar configurations to the MFP 10A and the server 50A according to the above-described embodiment. However, it should be noted that the image forming system 1B differs from the image forming system 1A in that it is a PullPrint system.

In the image forming system (PullPrint system) 1B, when a print instruction is given from a user using a client computer 70, print data is first transmitted from the client computer to the server computer 50B and temporarily stored in the server computer 50B. Thereafter, the user then performs a PullPrint operation using the operation panel unit 6c or the like of the MFP 10B, and in accordance with that PullPrint operation, the MFP 10B acquires (pulls) the print data from the server computer 50B and prints out (prints) the acquired print data.

In the PullPrint operation using the operation panel unit 6c of the MFP 10B, an operation of setting the output mode of the print data is performed following a user authentication operation. In particular, at this time, an idea similar to that as described above may be applied. In other words, an idea similar to that as described above may be applied when various types of setting operations for the print output operation are performed using the operation panel unit of the MFP.

More specifically, a combination of two or more settings regarding the print output operation, the settings being prohibited from being combined, is stored as the prohibited combination information MP in the MFP 10B. Then, if it has been determined that "current settings" that have been changed using the operation panel unit 6c of the MFP 10B include such a combination of settings that are prohibited from being combined, that fact may be stored in predetermined data (e.g., cookie) in a predetermined storage area (e.g., cookie storage area) under control of the web browser 21 in the MFP 10B. An example of the "combination of settings that are prohibited from being combined" is a combination of a setting "two-point stapling" for a setting item "stapling" and a setting "two-hole punching" for a setting item "punching" regarding the print output operation. Another example of the "combination of settings that are prohibited from being combined" is a combination of a setting "OHP sheet" for a setting item "paper type" and a setting "Z-fold (three-fold)" for a setting item "folding" regarding the print output operation.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming system comprising:
an image forming apparatus; and
a server apparatus communicable with the image forming apparatus,
the image forming apparatus including:
a storage unit configured to store prohibited combination information about two or more settings regarding the image forming apparatus, the two or more settings being prohibited from being set in combination with each other;
a display control unit configured to display a user interface screen on a display unit, based on web page data that is received from a web server in the server apparatus, using a web browser that communicates with the web server;
a reception unit configured to receive an input for changing settings, using the user interface screen;
a first determination unit configured to determine, based on the prohibited combination information, whether or not the two or more settings that are prohibited from being combined are included in a plurality of current settings that include a content of change of settings received by the reception unit; and a storage information control unit configured to, in response to the first determination unit determining that the two or more settings that are prohibited from being combined are included in the plurality of current settings, store a statement that the two or more settings that are prohibited from being combined are included in the plurality of current settings in predetermined data in a predetermined storage area under control of the web browser, the server apparatus is configured to acquire the predetermined data and comprises a second determination unit configured to determine whether or not the two or more settings that are prohibited from being combined are included in the plurality of current settings, based on whether the statement is in the predetermined data transmitted from the web browser, and the display control unit configured to, if the server apparatus has acquired the predetermined data with the statement that the two or more settings that are prohibited from being combined are included in the plurality of current settings, update the user interface screen so as to display a warning about the statement that the two or more settings that are prohibited from being combined are included in the plurality of current settings.

2. The image forming system according to claim 1, wherein the first determination unit is provided separately from the web browser.

3. The image forming system according to claim 1, wherein the storage information control unit is configured to store the plurality of current settings that include the content of change of settings received by the reception unit, in the predetermined storage area, and the first determination unit includes:

a monitoring unit configured to monitor the predetermined storage area and acquire the plurality of current settings based on a storage content in the predetermined storage area; and a determination processing unit configured to determine whether or not the plurality of current settings acquired by the monitoring unit include the two or more settings that are prohibited from being combined.

4. The image forming system according to claim 1, wherein the first determination unit is configured to, in response to receipt of the input for changing settings using the interface screen of the web browser, determine whether or not the two or more settings that are prohibited from being combined are included in the plurality of current settings, and the display control unit is configured to, in response to the first determination unit determining that the two or more settings that are prohibited from being combined are included in the plurality of current settings, update the user interface screen using the predetermined data.

5. The image forming system according to claim 1, wherein the server apparatus includes:

a generation unit configured to generate web page data for warning screen display in response to the second determination unit determining that the two or more settings that are prohibited from being combined are included in the plurality of current settings;

a notification unit configured to transmit a notification that display of the web browser is to be updated to the image forming apparatus after generation of the web page data for warning screen display; and a communication control unit configured to transmit the web page data for warning screen display to the web browser in response to an information transmission request that is transmitted from the web browser in the image forming apparatus in accordance with the notification, and the display control unit is configured to update and display the user interface screen, based on the web page data for warning screen display.

6. The image forming system according to claim 5, wherein the image forming apparatus further includes an update instruction unit provided separately from the web browser and configured to, upon receipt of the notification from the notification unit, give a display update instruction based on the notification to the web browser and cause the web browser to transmit the information transmission request to the web server.

7. The image forming system according to claim 5, wherein the first determination unit is configured to determine whether or not the two or more settings that are prohibited from being combined are included in the plurality of current settings, in response to receipt of the input for changing settings using the interface screen of the web browser, and the image forming apparatus further includes a transmission control unit configured to transmit the predetermined data to the web server in response to the first determination unit determining that the two or more settings that are prohibited from being combined are included in the plurality of current settings.

8. The image forming system according to claim 1, wherein the predetermined storage area is a cookie storage area or a web storage area.

9. An image forming apparatus communicable with a server apparatus, comprising:

a storage unit configured to store prohibited combination information about two or more settings regarding the image forming apparatus, the two or more settings being prohibited from being set in combination with each other;

a display control unit configured to display a user interface screen on a display unit, based on web page data that is received from a web server in the server apparatus, using a web browser that communicates with the web server;

a reception unit configured to receive an input for changing settings, using the user interface screen;

a determination unit configured to determine, based on the prohibited combination information, whether or not the two or more settings that are prohibited from being combined are included in a plurality of current settings that includes a content of change of settings received by the reception unit; and a storage information control unit configured to, in response to the determination unit determining that the two or more settings that are prohibited from being combined are included in the plurality of current settings, store a statement that the two or more settings that are prohibited from being combined are included in the plurality of current settings, in predetermined data in a predetermined storage area under control of the web browser, the display control unit being configured to communicate with the server apparatus which has acquired the predetermined data transmitted from the web browser, to establish whether the two or more settings that are prohibited from being combined are included in the plurality of current settings based on whether the statement is in the predetermined data, and then update the user interface screen so as to display a warning about the statement that the two or more settings that are prohibited from being combined are included in the plurality of current settings.

10. A non-transitory computer-readable recording medium that records a program for causing a computer built into an image forming apparatus to execute the steps of:
- a) displaying a user interface screen regarding the image forming apparatus, based on web page data that is received from a web server in an external server apparatus, using a web browser that communicates with the web server;
- b) receiving an input for changing settings regarding the image forming apparatus, using the user interface screen;
- c) based on prohibited combination information regarding two or more settings that are prohibited from being set in combination with each other, the prohibited combination information being stored in the image forming apparatus, determining whether or not the two or more settings that are prohibited from being combined are included in a plurality of current settings obtained after the input for changing settings;
- d) in response to determining that the two or more settings that are prohibited from being combined are included in the plurality of current settings, storing a statement that the two or more settings that are prohibited from being combined are included in the plurality of current settings, in predetermined data in a predetermined storage area under control of the web browser; and
- e) communicating with the external server apparatus which has acquired the predetermined data transmitted from the web browser, to establish whether two or more settings that are prohibited from being combined are included in the plurality of current settings based on whether the statement is in the predetermined data, and updating the user interface screen so as to display a warning about the statement that the two or more settings that are prohibited from being combined are included in the plurality of current settings.

* * * * *

UNITED STATES PATENT AND TRADEMARK OFFICE
CERTIFICATE OF CORRECTION

PATENT NO. : 9,092,704 B2  
APPLICATION NO. : 13/756019  
DATED : July 28, 2015  
INVENTOR(S) : Okihisa Yoshida et al.

Page 1 of 1

It is certified that error appears in the above-identified patent and that said Letters Patent is hereby corrected as shown below:

Title Page

Under (56) References Cited, U.S. PATENT DOCUMENTS, please delete:

"1,967,454 A1   5/2007   Ohta et al."

Signed and Sealed this  
Fifth Day of April, 2016

Michelle K. Lee  
*Director of the United States Patent and Trademark Office*